United States Patent
Kato et al.

(10) Patent No.: US 8,948,317 B2
(45) Date of Patent: Feb. 3, 2015

(54) RECEIVER APPARATUS, RECEPTION METHOD, COMMUNICATION SYSTEM, AND COMMUNICATION METHOD

(75) Inventors: Katsuya Kato, Osaka (JP); Takashi Yoshimoto, Osaka (JP); Ryota Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/982,912

(22) PCT Filed: Jan. 13, 2012

(86) PCT No.: PCT/JP2012/050548
§ 371 (c)(1),
(2), (4) Date: Jul. 31, 2013

(87) PCT Pub. No.: WO2012/105291
PCT Pub. Date: Aug. 9, 2012

(65) Prior Publication Data
US 2013/0308733 A1 Nov. 21, 2013

(30) Foreign Application Priority Data
Feb. 3, 2011 (JP) .................................. 2011-021528

(51) Int. Cl.
*H03D 1/00* (2006.01)
*H04L 25/02* (2006.01)
*H04L 27/26* (2006.01)

(52) U.S. Cl.
CPC .......... *H04L 25/0212* (2013.01); *H04L 25/022* (2013.01); *H04L 27/2649* (2013.01)
USPC ........................... 375/340; 375/260; 370/208

(58) Field of Classification Search
USPC .......................................... 375/346, 260, 141
See application file for complete search history.

(56) References Cited

U.S. PATENT DOCUMENTS

| 5,307,376 A | 4/1994 | Castelain et al. |
| 2005/0157801 A1 | 7/2005 | Gore et al. |

(Continued)

FOREIGN PATENT DOCUMENTS

| JP | 05-75568 A | 3/1993 |
| JP | 2007-519368 A | 7/2007 |

(Continued)

OTHER PUBLICATIONS

Official Communication issued in International Patent Application No. PCT/JP2012/050548, mailed on Feb. 28, 2012.

(Continued)

*Primary Examiner* — Eva Puente
(74) *Attorney, Agent, or Firm* — Keating & Bennett, LLP

(57) ABSTRACT

A receiver apparatus includes a channel estimator (b106) to perform channel estimation. The channel estimator includes an interim channel impulse estimating unit (b106-1) that calculates an interim channel impulse response estimation value, a path extracting unit (b106-3) that extracts a path for use in calculation of a channel impulse response estimation value from among paths forming the interim channel impulse response estimation values, a channel impulse response estimating unit (b106-4) that calculates the channel impulse response estimation value using the path extracted by the path extracting unit, and a frequency response estimating unit (b106-5) that converts the channel impulse response estimation value into a frequency response estimation value by time-frequency transforming the channel impulse response estimation value. In this way, a receiver apparatus capable of performing accurate channel estimation results.

11 Claims, 14 Drawing Sheets

(56) References Cited

U.S. PATENT DOCUMENTS

| | | | |
|---|---|---|---|
| 2008/0063040 A1 | 3/2008 | Akahori | |
| 2008/0101216 A1 | 5/2008 | Tanaka et al. | |
| 2009/0110033 A1* | 4/2009 | Shattil | 375/141 |
| 2009/0177951 A1* | 7/2009 | Lee et al. | 714/799 |
| 2009/0225878 A1* | 9/2009 | Papadopoulos et al. | 375/260 |
| 2010/0128823 A1 | 5/2010 | Sasaoka et al. | |
| 2013/0301400 A1* | 11/2013 | Ma et al. | 370/208 |

FOREIGN PATENT DOCUMENTS

| | | |
|---|---|---|
| JP | 2008-072387 A | 3/2008 |
| JP | 2008-118194 A | 5/2008 |
| JP | 2010-124368 A | 6/2010 |
| JP | 2010-199902 A | 9/2010 |

OTHER PUBLICATIONS

Suyama et al., "A Scattered Pilot OFDM Receiver Employing Turbo ICI Cancellation in Fast Fading Environments", IEICE Trans. Commun., vol. E88-B, No. 1, Jan. 2005, pp. 115-121.

English translation of Official Communication issued in corresponding International Application PCT/JP2012/050548, mailed on Feb. 28, 2012.

Official Communication issued in corresponding Japanese Patent Application No. 2011-021528, mailed on Aug. 26, 2014.

Kato, et al.; "Iterative Detection and Channel Estimation Employing Adaptive Tap Selection for Scattered Pilot OFDM Receiver"; The Institute of Electronics, Information and Communication Engineers Technical Report; vol. 106; No. 168; Jul. 12, 2006; pp. 103-108.

Ling, et al.; "Enhanced Channel Estimation and Symbol Detection for High Speed Mimo Underwater Acoustic Communications"; Digital Signal Processing Workshop and 5th IEEE Signal Processing Education Workshop; IEEE; Jan. 4, 2009; pp. 126-131.

\* cited by examiner

Prior Art

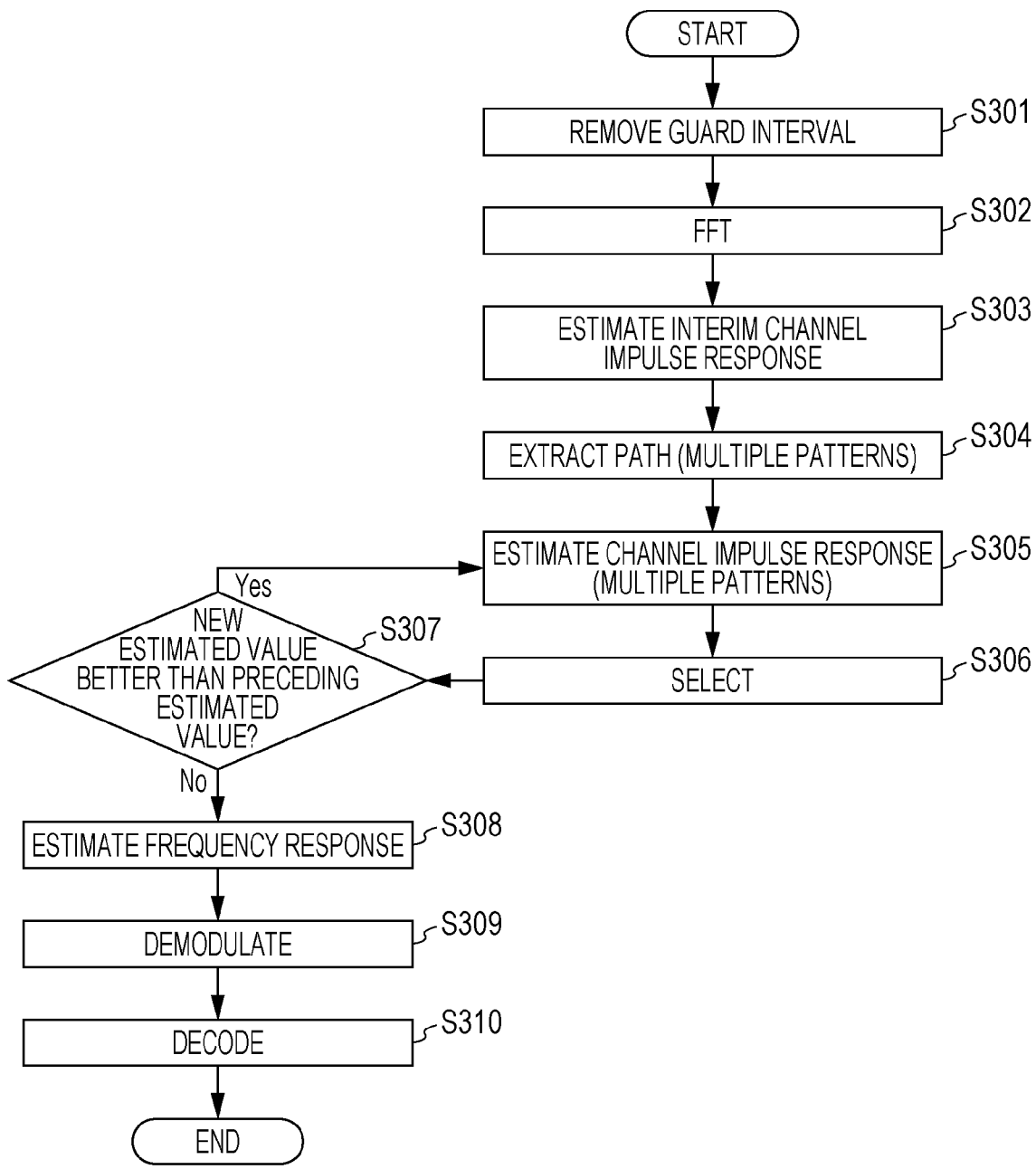

RECEIVER APPARATUS, RECEPTION METHOD, COMMUNICATION SYSTEM, AND COMMUNICATION METHOD

TECHNICAL FIELD

The present invention relates to a receiver apparatus, a reception method, a communication system, and a communication method.

BACKGROUND ART

In the field of radio communications, a receiver apparatus performs channel estimation to learn a radio channel state. Since the receiver apparatus performs demodulation and decoding using channel estimation results, transmission performances are greatly degraded if the accuracy of the channel estimation is decreased. To perform accurate channel estimation, statistic property of a channel needs to be identified. The statistic property of the channel includes power of a path forming a channel, and a delay time from a previously received path. FIG. 1 illustrates an example of a channel impulse response of a channel in the time domain, and arrows labeled 100-1 through 100-8 denote paths. Labels 100-4 and 100-5 are intended to mean delay times where no significant paths are present. Such a location is herein interpreted as a path having zero power.

Non Patent Literature 1 describes a method of estimating all paths from a preceding path to a path having a predetermined delay time in channel estimation of scattered pilot OFDM. In the example of FIG. 1, paths 100-1 through 100-8 are estimated.

CITATION LIST

Non Patent Literature

NPL 1: S. Suyama, M. Ito, K. Fukawa, H. Suzuki, "A Scattered Pilot OFDM Receiver Employing Turbo ICI Cancellation in Fast Fading Environments", IEICE Trans. Commun., Vol. E88-B, No. 1, January 2005

SUMMARY OF INVENTION

Technical Problem

However, since a path unnecessary in channel estimation is estimated in accordance with the method described in Non Patent Literature 1, noise and interference accounting for the path may be contained in a channel estimation value. Estimation accuracy is decreased accordingly. The present invention has been developed in view of this problem, and the object of the present invention is to provide a receiver apparatus that performs high-accuracy channel estimation.

Solution to Problem

A receiver apparatus of the present invention includes a channel estimator to perform channel estimation. The channel estimator includes an interim channel impulse estimating unit that calculates an interim channel impulse response estimation value, a path extracting unit that extracts a path for use in calculation of a channel impulse response estimation value from among paths forming the interim channel impulse response estimation values, a channel impulse response estimating unit that calculates the channel impulse response estimation value using the path extracted by the path extracting unit, and a frequency response estimating unit that converts the channel impulse response estimation value into a frequency response estimation value by time-frequency transforming the channel impulse response estimation value.

The path extracting unit may extract paths of a number that is predetermined in the order of high to low power of the interim channel impulse response estimation values.

The channel estimator may further include a selector unit that selects the best channel impulse estimation value from among at least two channel impulse estimation values.

The channel estimator may includes a plurality of path extracting units and a plurality of channel impulse response estimating units.

The channel estimator may successively iterate a calculation of the channel impulse response estimation value.

The path extracting unit may successively iterate the calculation of the channel impulse response estimation value with the number of paths decreased.

The path extracting unit may successively iterate the calculation of the channel impulse response estimation value with the number of paths increased.

Upon completing a predetermined number of iterations of the calculation of the channel impulse response estimation value, the channel estimator may end an estimation operation thereof.

The selector unit may select the best estimation value in accordance with the Bayesian information criterion.

The present description contains the contents of the specification and the drawings of Japanese Patent Application 2011-021528 which priority of the present patent application is based on.

Advantageous Effects of Invention

According to the present invention, accuracy of the channel estimation is substantially increased.

BRIEF DESCRIPTION OF DRAWINGS

FIG. 15 is a flowchart illustrating an operation of the receiver apparatus of the third embodiment of the present invention.

DESCRIPTION OF EMBODIMENTS

First Embodiment

Figure 1:
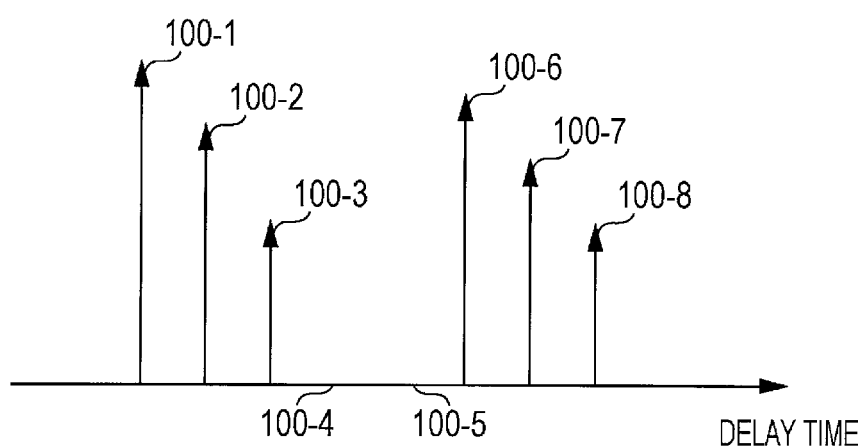
FIG. 1 illustrates an example of a channel impulse response of a channel in the time domain.
Figure 2:
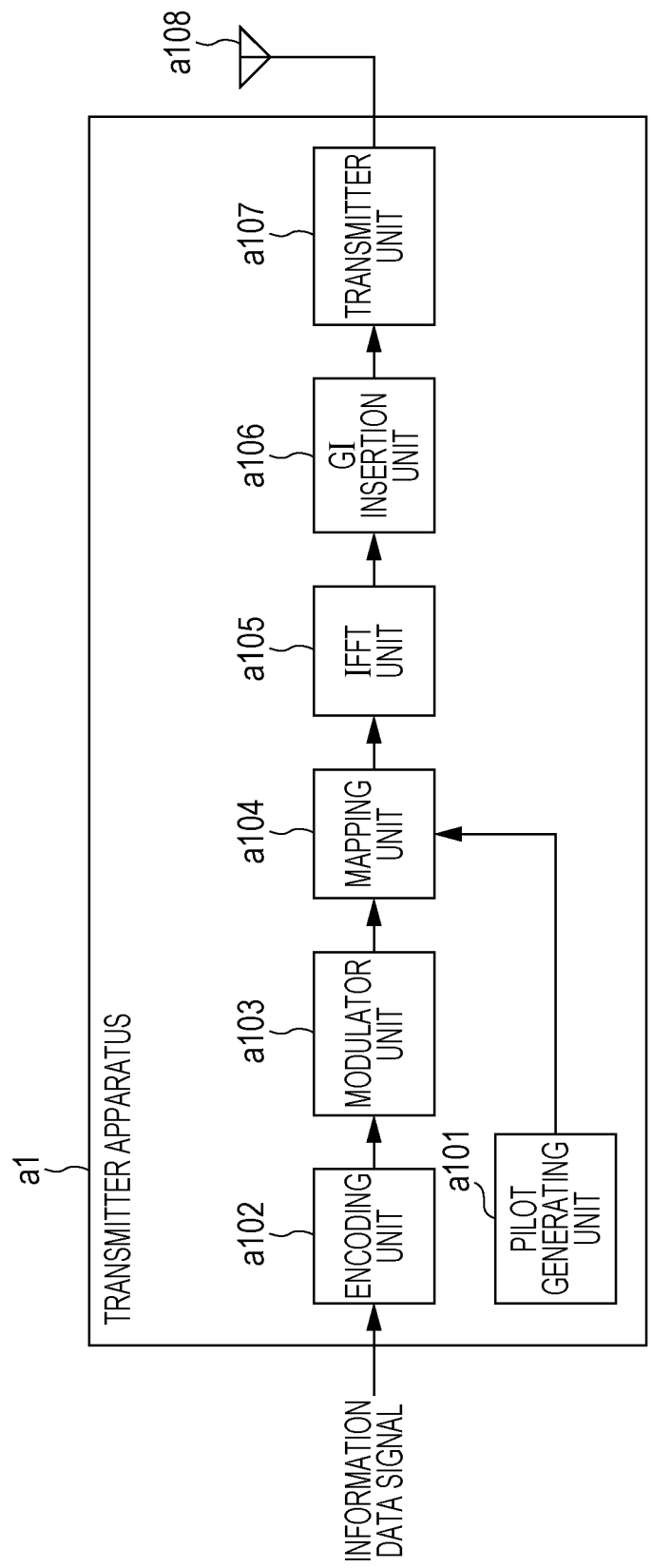
FIG. 2 is a schematic block diagram illustrating a transmitter apparatus of a first embodiment of the present invention.

FIG. 2 is a schematic block diagram illustrating a transmitter apparatus of a first embodiment of the present invention. In the present embodiment, a transmitter apparatus a1 is described. In FIG. 2, the transmitter apparatus a1 includes a pilot generating unit a101, an encoding unit a102, a modulator unit a103, a mapping unit a104, an IFFT (Inverse Fourier Transform) unit (also referred to as a frequency-time transform unit) a105, a GI (Guard Interval) insertion unit a106, a transmitter unit a107, and a transmit antenna a108. The transmitter apparatus a1 transmits an OFDM signal.

The pilot generating unit a101 generates a pilot symbol. An amplitude value of a waveform (or a signal sequence) of the pilot symbol is pre-stored on a receiver apparatus. The pilot generating unit a101 outputs the pilot symbol to the mapping unit a104. In the discussion of the present embodiment, a receiver apparatus b1 is used as the receiver apparatus. The receiver apparatus b1 performs channel estimation with the pilot symbol handled as a reference signal.

The encoding unit a102 encodes information bits to be transmitted to the receiver apparatus b1 using error correction code, such as convolutional code, Turbo code, LDPC (Low Density Parity Check) code, thereby generating encoded bits. The encoding unit a102 outputs the generated encoded bits to the modulator unit a103.

The modulator unit a103 modulates the encoded bits input from the encoding unit a102 using a modulation scheme, such as PSK (Phase Shift Keying) or QAM (Quadrature Amplitude Modulation), thereby generating a modulation symbol. The modulator unit a103 outputs the generated modulation symbol to the mapping unit a104.

Figure 3:
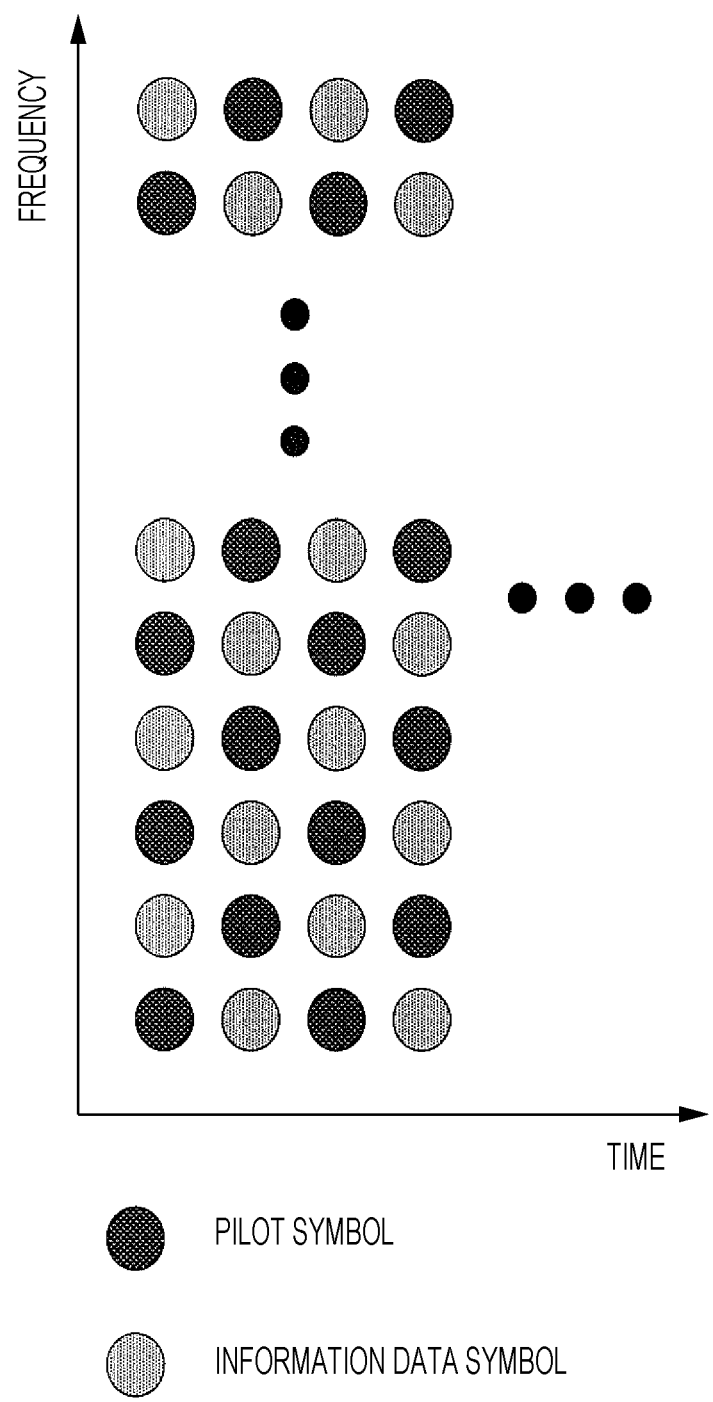
FIG. 3 illustrates an example of mapping in which a mapping unit a104 maps a pilot symbol to a modulation signal.

The mapping unit a104 maps the pilot symbol input from the pilot generating unit a101 and the modulation symbol input from the modulator unit a103 to a resource (time-frequency band) in accordance with predetermined mapping information, thereby generating a signal in the frequency domain. The mapping unit a104 outputs the signal in the frequency domain to the IFFT unit a105. The resource herein refers to a unit according to which the modulation symbol is located. The modulation symbol includes a single subcarrier and an FFT period to be discussed later in a frame that the transmitter apparatus a1 is to transmit. The transmitter apparatus a1 determines the mapping information and notifies the receiver apparatus b1 of the mapping information in advance. FIG. 3 illustrates an example of mapping in which the mapping unit a104 maps the pilot symbol to a modulation signal. Although scattered pilot is described as an example of discrete pilot arrangement in the present embodiment, the present invention is not limited to the scattered pilot. The present is applicable to another arrangement such as a preamble arrangement.

The IFFT unit a105 frequency-time transforms the signal in the frequency domain input from the mapping unit a104, thereby generating a signal in the time domain. Here, unit time period of IFFT is referred to as an FFT period. The IFFT unit a105 outputs the generated signal in the time domain to the GI insertion unit a106.

The GI insertion unit a106 attaches GI to each signal in the time domain input from the IFFT unit a105 in the FFT period. The GI refers to a known signal, such as a cyclic prefix (CP) that is a copy of a trailing portion of the signal in the FFT period, or zero padding having consecutive zero segments, or Golay code. The GI insertion unit a106 attaches such a signal to the front end of the signal in the FFT period.

The sum of the FFT period and a time period of the GI attached to the signal during the corresponding time period by the GI insertion unit a106 (referred to as a GI period) is referred to as an OFDM symbol period. A signal during the OFDM symbol period is referred to an OFDM symbol. The GI insertion unit a106 outputs the signal having the GI attached thereto to the transmitter unit a107.

The GI may be inserted into the trailing portion of the FFT period. For example, if the cyclic prefix is used, a copy of part of the leading portion of the FFT period is attached to the back end of the signal in the FFT period. In the case of the cyclic prefix, it is sufficient if the periodicity of the OFDM symbol period is maintained, and the copy of part of the leading portion of the FFT period is not attached to the back end of the signal in the FFT period.

The transmitter unit a107 digital-to-analog converts a signal input from the GI insertion unit a106, and wave-shapes the resulting analog signal. The transmitter unit a107 up-converts the wave-shaped signal from a baseband to a radio frequency band, and then transmits a signal in the radio frequency band from the transmit antenna a108 to the receiver apparatus b1.

Figure 4:
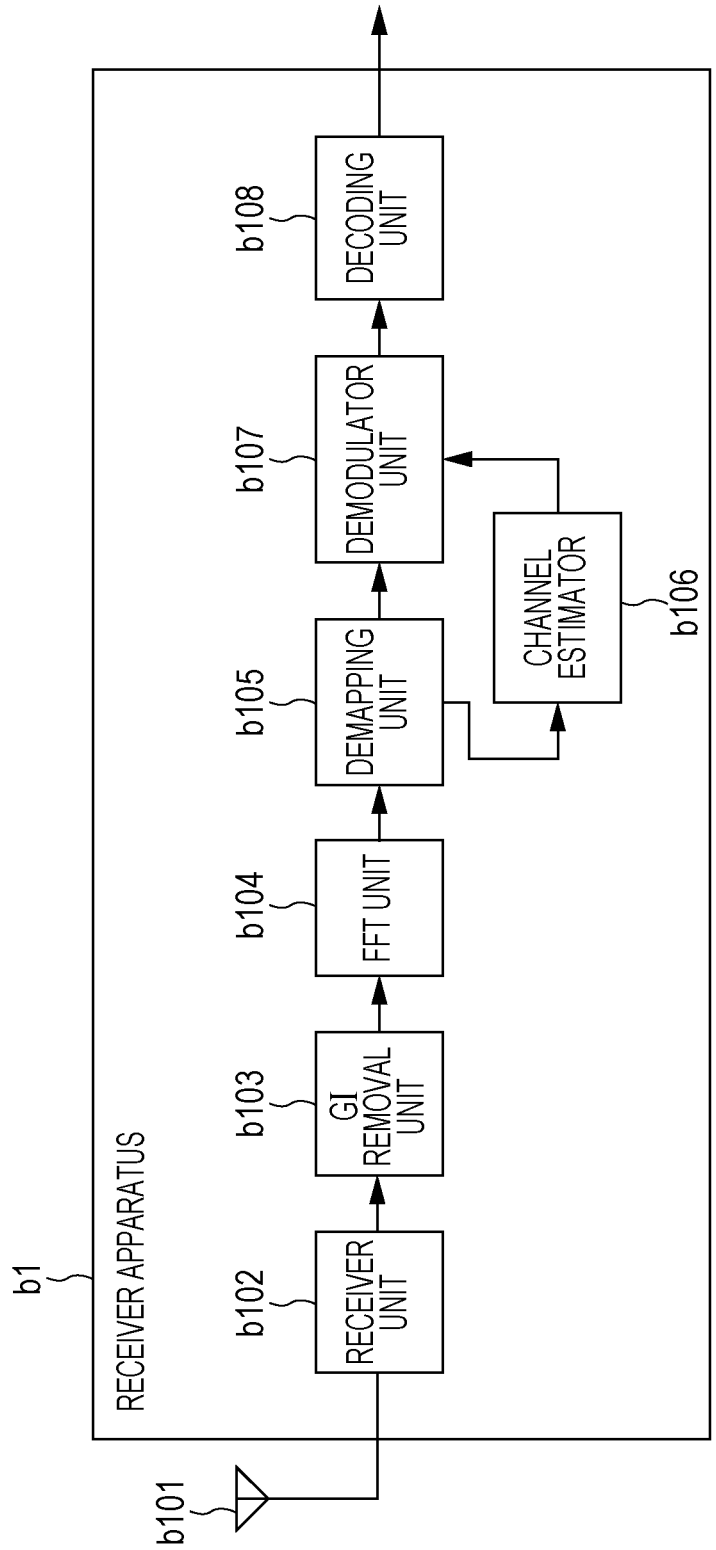
FIG. 4 is a schematic block diagram illustrating a configuration of a receiver apparatus b1 of the first embodiment of the present invention.

FIG. 4 is a schematic block diagram illustrating a configuration of the receiver apparatus b1 of the present embodiment. As illustrated in FIG. 4, the receiver apparatus b1 includes a receive antenna b101, a receiver unit b102, a GI removal unit b103, an FFT unit (also referred to as a time-frequency transform unit) b104, a demapping unit b105, a channel estimator b106, a demodulator unit b107, and a decoding unit b108.

The receiver unit b102 receives a transmission signal transmitted from the transmitter apparatus a1 via the receive antenna b101. The receiver unit b102 performs a frequency conversion operation and an analog-to-digital conversion operation on the received signal.

The GI removal unit b103 removes the GI from the received signal input from the receiver unit b102, and then outputs the resulting signal to the FFT unit b104.

The FFT unit b104 performs time-frequency transforms the signal in the time domain input from the GI removal unit b103, and outputs to the demapping unit b105 the transformed signal in the frequency domain.

The demapping unit b105 demaps the input signal in accordance with demapping information of which the transmitter apparatus a1 has notified the receiver apparatus b1 in advance, and outputs to the channel estimator b106 a reception signal of a subcarrier along which the separated pilot symbol has been transmitted. The demapping unit b105 also outputs to the demodulator unit b107 a reception signal of a subcarrier along which data has been transmitted.

Figure 5:
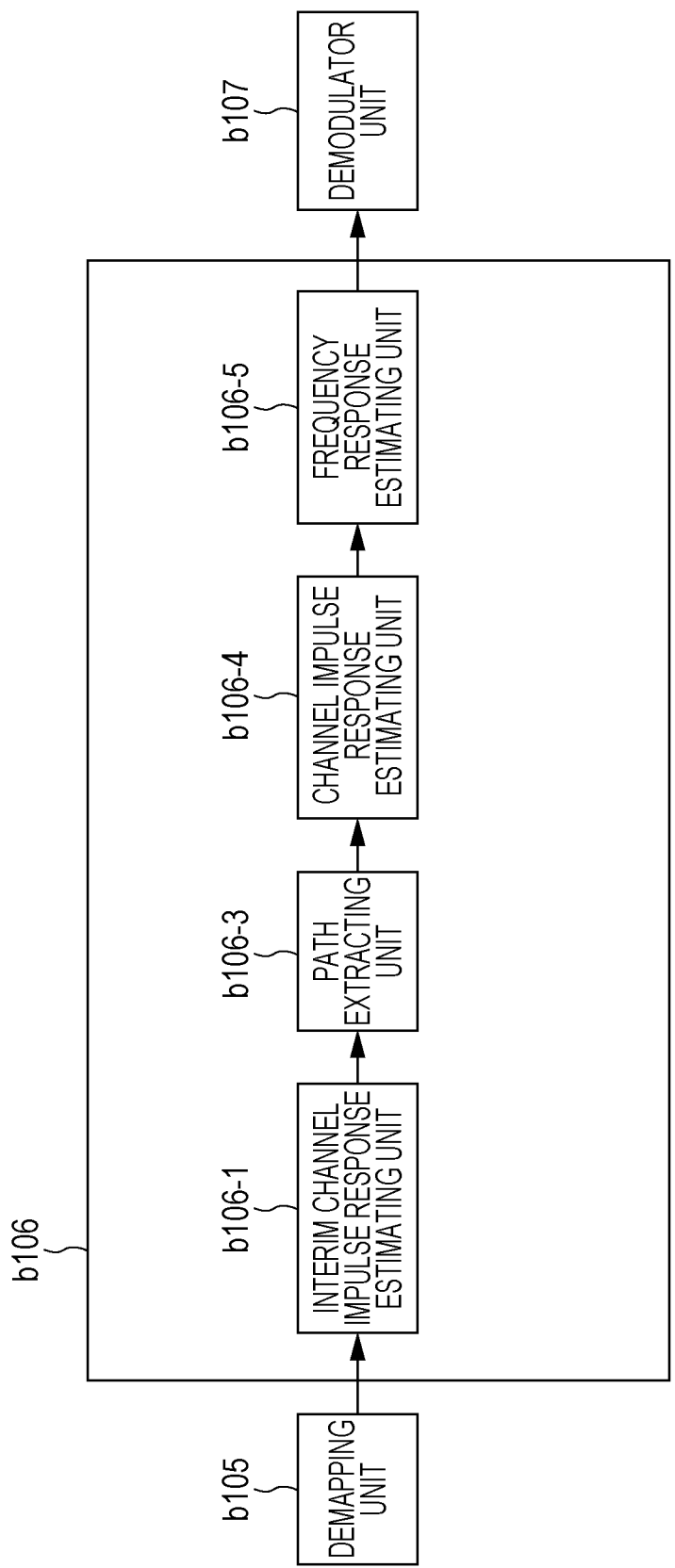
FIG. 5 is a schematic block diagram illustrating a configuration of a channel estimator b106.

FIG. 5 is a schematic block diagram illustrating a configuration of the channel estimator b106. As illustrated in FIG. 5, the channel estimator b106 includes an interim channel impulse response estimating unit b106-1, a path extracting unit b106-3, a channel impulse response estimating unit b106-4, and a frequency response estimating unit b106-5.

The interim channel impulse response estimating unit b106-1 estimates a frequency response in accordance with the reception signal input from the demapping unit b105 and a pre-stored pilot symbol, calculates an interim channel impulse response estimation value by performing an IFFT operation on the frequency response, and then outputs the interim channel impulse response estimation value to the path extracting unit b106-3.

The path extracting unit b106-3 extracts $N_s$ paths in the order from high to low power from among the interim channel impulse response estimation values output from the interim channel impulse response estimating unit b106-1. A path that is not selected as a result is set to be zero. The selection results are output to the channel impulse response estimating unit b106-4.

The channel impulse response estimating unit b106-4 estimates a channel impulse response value using path extraction information output from the path extracting unit b106-3 and the interim channel impulse response estimation value. This operation is described in detail below. The channel impulse response estimation value is output to the frequency response estimating unit b106-5.

The frequency response estimating unit b106-5 time-frequency transforms the channel impulse response estimation value output from the channel impulse response estimating unit b106-4, and then outputs the resulting signal to the demodulator unit b107.

Using a pre-stored subcarrier, the channel estimator b106 measures noise power of the subcarrier on which a pilot symbol is located (referred to as a pilot subcarrier). A specific calculation method of the noise power is described below in conjunction with the operating principle of the channel estimator b106.

The demodulator unit b107 calculates a filter coefficient, such as ZF (Zero Forcing) criterion, MMSE (Minimum Mean Square Error) criterion, using the frequency response and the noise power input from the channel estimator b106. Using the calculated filter coefficient, the demodulator unit b107 performs compensation for variations in the amplitude and phase of a signal (referred to as channel compensation).

The demodulator unit b107 outputs a bit Log Likelihood Ratio (LLR) as demodulation results to the decoding unit b108.

The decoding unit b108 performs a demodulation process on a demodulation symbol input from the demodulator unit b107 using, for example, Maximum Likelihood Decoding (MLD), Maximum A posteriori Probability (MAP), log-Map, Max-log-MAP, SOVA (Soft Output Viterbi Algorithm).

Figure 6:
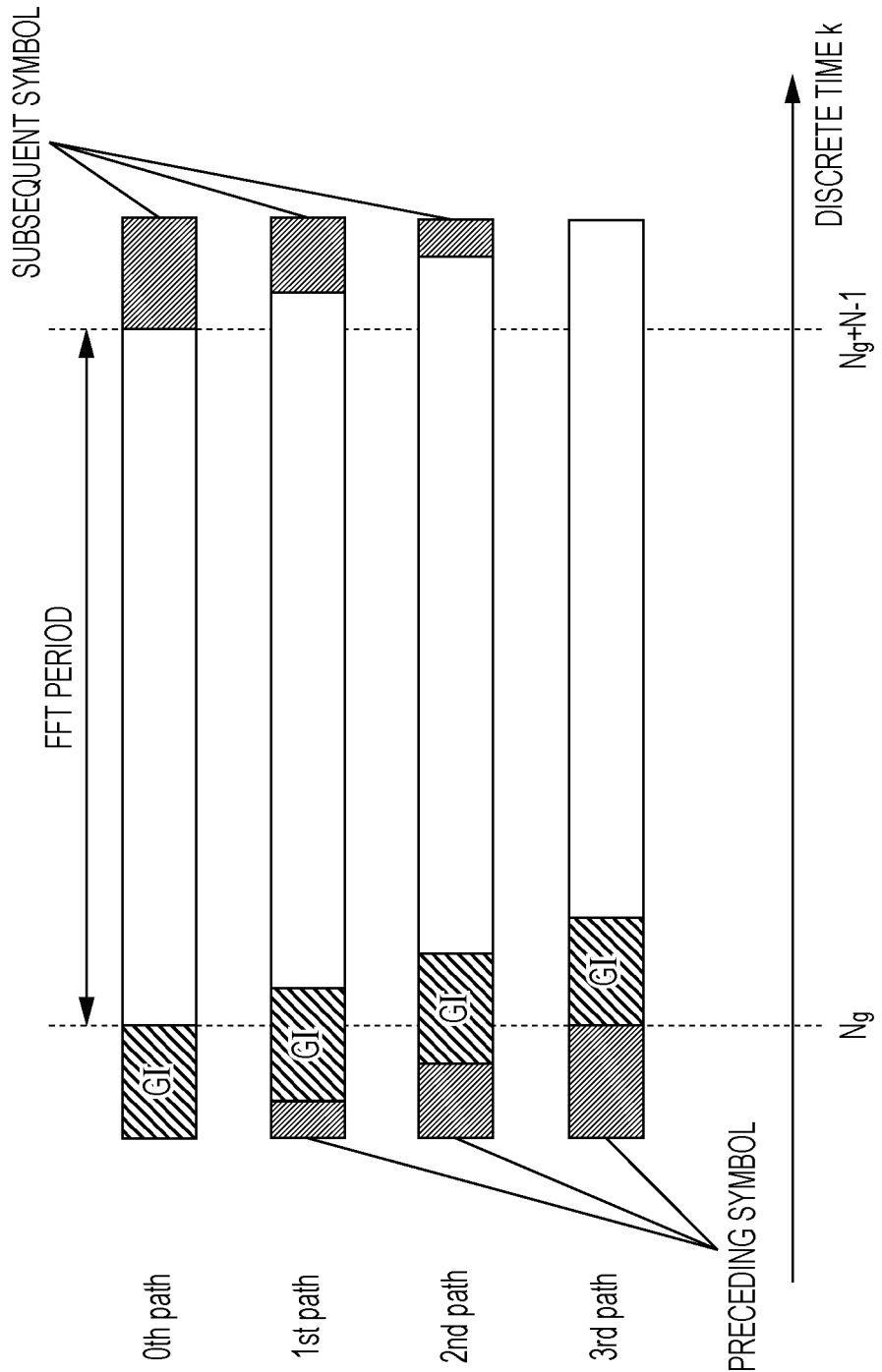
FIG. 6 illustrates an example of a reception signal of the first embodiment of the present invention.

FIG. 6 illustrates an example of a reception signal of the embodiment of the present invention. As illustrated in FIG. 6, a maximum delay does not exceed a GI length and there is no interference from a preceding OFDM symbol.

As illustrated in FIG. 6, the abscissa is a time axis, and represents discrete time segmented by predetermined time band. As illustrated in FIG. 6, each area hatched with rightward rising diagonal lines represents GI. Each area hatched with leftward rising diagonal lines represents received signals of preceding and subsequent OFDM symbols.

Here, N represents the number of points during the FFT (Fast Fourier Transform) period (also the number of points during an IFFT (Inverse Fast Fourier Transform) period), and $N_g$ represents the number of points of GI. The number of points here refers to the number of discrete times.

Operating Principle

An operating principle of the receiver apparatus b1 is described with reference to FIG. 4.

Signal $r_{i,k}$ of an i-th symbol at k-th discrete time received by the receiver unit b102 is expressed by the following Expressions (1) and (2).

[Expression 1]

$$r_{i,k} = \sum_{d=0}^{D} h_{i,d} s_{i,k-d} + z_{i,k} \quad (1)$$

[Expression 2]

$$S_{i,k} = \frac{1}{\sqrt{N}} \sum_{n=0}^{N-1} S_{i,n} \exp\left[j\frac{2\pi n}{N}(k - N_g)\right] \quad (2)$$

Here, D represents the maximum delay time, $h_{i,d}$ represents a complex amplitude of a path having a propagation channel number d (referred to as a d-th path) of an i-th symbol, $s_{i,k}$ represents a transmission signal of k-th discrete time of the i-th symbol in the time domain, and $Z_{i,k}$ represents noise of the i-th symbol in the time domain. Also, N represents the number of points during the FFT period, $S_{i,n}$ represents a modulation signal of the i-th symbol of an n-th subcarrier, $N_g$ represents the number of points during the GI period (see FIG. 6), and j represents a unit of complex number. Note that complex amplitudes of d=0–D are collectively referred to as a channel impulse response.

The FFT unit b104 time-frequency transforms the reception signal $r_{i,k}$ in the FFT period, thereby resulting in a signal $R_{i,n}$. The signal $R_{i,n}$ is expressed by the following Expression (3).

[Expression 3]

$$R_{i,n} = \frac{1}{\sqrt{N}} \sum_{k=N_g}^{N_g+N-1} r_{i,k} \exp\left[-j\frac{2\pi n}{N}(k-N_g)\right] \quad (3)$$

$$= H_{i,n} S_{i,n} + Z_{i,n}$$

Here, $Z_{i,n}$ is noise of an n-th subcarrier. $H_{i,n}$ is a frequency response of the n-th subcarrier of an i-th symbol, and is represented by the following Expression (4)

[Expression 4]

$$H_{i,n} = \sum_{d=0}^{D} h_{i,d} \exp\left[-j\frac{2\pi n}{N} d\right] \quad (4)$$

The rest of the function of the receiver apparatus b1 is described on the assumption that the estimation value has been obtained. If filtering of MMSE criterion is used, the demodulator unit b107 calculates a demodulation symbol $S'_{i,n}$ in accordance with the following Expression (5).

[Expression 5]

$$S'_{i,n} = \frac{H^*_{i,n}}{H^*_{i,n} H_{i,n} + \sigma_z^2} R_{i,n} \quad (5)$$

Here, Y* represents a complex conjugate of Y. In Expression (5), $\sigma_z^2$ is power of $Z'_{i,n}$ and is expressed by the following Expression (6).

[Expression 6]

$$\sigma_z^2 = E[|Z_{i,n}|^2] \quad (6)$$

E[X] here represents an ensemble average of X. The power here is calculated in accordance with Expression (7), and the result of the calculation is substituted for in Expression (5) to calculate the demodulation symbol $S'_{i,n}$.

[Expression 7]

$$\sigma_z'^2 = \left(\sum_{n \in P_i} |R_{i,n}|^2 - |P_i|\right) \Big/ |P_i| \quad (7)$$

Here, $\sigma_z'^2$ is an estimated value of $\sigma_z^2$, and $P_i$ is a set of pilot subcarriers of the i-th symbol. If it is assumed that an arithmetic averages of sufficient numbers equals the ensemble average, a calculation method used herein is based on the fact that Expression (7) is rewritten as Expression (8).

[Expression 8]

$$\sigma_z'^2 = \left(\sum_{n \in P_i} |H_{i,n} S_{i,n}|^2 + \sum_{n \in P_i} |Z_{i,n}|^2 - |P_i|\right) \Big/ |P_i| \quad (8)$$
$$= (|P_i| + |P_i|\sigma_z^2 - |P_i|)/|P_i|$$
$$= \sigma_z^2$$

In Expression (8), the power of the pilot signal is normalized to 1, and the mean power of the frequency response is normalized to 1. More specifically, this Expression is obtained if the following Expression (9) holds.

[Expression 9]

$$\sum_{n \in P_i} |H_{i,n} S_{i,n}|^2 = |P_i| \quad (9)$$

If the power of the pilot signal is not 1, an adjustment coefficient may be introduced accordingly. The normalization of the frequency response is performed in view of an amplitude adjustment when the receiver unit b102 performs analog-to-digital conversion.

The demodulator unit b107 calculates the bit Log Likelihood Ratio from the demodulation symbol $S'_{i,n}$ of Expression (5). In this calculation process, an equivalent amplitude gain is used. More specifically, in the case of QPSK, the equivalent amplitude gain $\mu_{i,n}$ of the n-th subcarrier is expressed by Expression (10) while the bit Log Likelihood Ratios $\lambda$ are expressed by the following Expressions (11) and (12). Here, Expressions (11) and (12) are a bit Log Likelihood Ratio $\lambda(b_{i,n,0})$ of a first bit $b_{i,n,0}$ and a bit Log Likelihood Ratio $\lambda(b_{i,n,1})$ of a second bit $b_{i,n,1}$.

[Expressions 10]

$$\mu_{i,n} = \frac{H_{i,n}^* H_{i,n}}{H_{i,n}^* H_{i,n} + \sigma_z^2} \quad (10)$$

$$\lambda(b_{i,n,0}) = \frac{4 \text{Re}|S'_{i,n}|}{\sqrt{2}(1 - \mu_{i,n})} \quad (11)$$

$$\lambda(b_{i,n,1}) = \frac{4 \text{Im}|S'_{i,n}|}{\sqrt{2}(1 - \mu_{i,n})} \quad (12)$$

An operation of the propagation channel estimation is described next. The interim channel impulse response estimating unit b106-1 calculates an estimation value $H'_{i,n}$ of the frequency response in accordance with Expression (3). More specifically, the interim channel impulse response estimating unit b106-1 calculates the estimation value in accordance with Expression (13).

[Expression 11]

$$H'_{i,n} = \frac{R_{i,n}}{S_{i,n}} \quad (13)$$

To calculate the estimation value, the signal $S_{i,n}$ of the n-th carrier needs to be known. But the pilot symbol may be used for this purpose.

A method of estimating the channel impulse response from the estimation value of the frequency response is described here. Now $n_1, n_2, \ldots, n_p$ represent pilot subcarriers, and $H_{i,P}$ represents a frequency response estimation vector.

$$H_{i,P} \quad \text{[Expression 12]}$$

is defined by the following Expression (14).

[Expression 13]

$$H_{i,P} = (H'_{i,n1} H'_{i,n2} \ldots H'_{i,np})^T \quad (14)$$

The bold letter herein represents a vector or a matrix.

$$Y_T \quad \text{[Expression 14]}$$

represents a transpose of $$Y. \quad \text{[Expression 15]}$$

For example, if the first OFDM symbol of FIG. 3 is considered, $n_1$ represents the lowest subcarrier, $n_2$ represents the subcarrier higher by two notches, $n_3$ represents the subcarrier higher by further two notches, . . . . By MMSE, a channel impulse response estimation vector is $$h_{i,MMSE} \quad \text{[Expression 16]}$$

is expressed by Expressions (15) and (16).

[Expressions 17]

$$h_{i,MMSE} = C_{i,h} F^H (F C_{i,h} F^H + \sigma_z^2 I_{N_P})^{-1} H_{i,P} \quad (15)$$

$$F = \begin{bmatrix} \exp\left(-j\frac{2\pi n_1}{N} 0\right) & \exp\left(-j\frac{2\pi n_1}{N} 1\right) & \cdots & \exp\left(-j\frac{2\pi n_1}{N} L\right) \\ \exp\left(-j\frac{2\pi n_2}{N} 0\right) & \exp\left(-j\frac{2\pi n_2}{N} 1\right) & \cdots & \exp\left(-j\frac{2\pi n_2}{N} L\right) \\ \vdots & \vdots & \ddots & \vdots \\ \exp\left(-j\frac{2\pi n_P}{N} 0\right) & \exp\left(-j\frac{2\pi n_P}{N} 1\right) & \cdots & \exp\left(-j\frac{2\pi n_P}{N} L\right) \end{bmatrix} \quad (16)$$

-continued $$C_{i,h} = \begin{pmatrix} E[h_{i,0}h_{i,0}^*] & E[h_{i,0}h_{i,1}^*] & \cdots & E[h_{i,0}h_{i,L}^*] \\ E[h_{i,1}h_{i,0}^*] & E[h_{i,1}h_{i,1}^*] & \cdots & E[h_{i,1}h_{i,L}^*] \\ \vdots & \vdots & \ddots & \vdots \\ E[h_{i,L}h_{i,0}^*] & E[h_{i,L}h_{i,1}^*] & \cdots & E[h_{i,L}h_{i,L}^*] \end{pmatrix} \quad (17)$$

Here, $N_p$ represents the number of pilot subcarriers.

$$I_x \quad \text{[Expression 18]}$$

represents a unit matrix having a size x. L represents an assumed maximum delay time, and may be fixed when the receiver apparatus b1 is developed. Alternatively, L may be set to be variable at the design stage of the receiver apparatus b1 and then updated when firmware, software, or the like of the receiver apparatus b1 are updated. Each element of $$C_{i,h} \quad \text{[Expression 19]}$$

represents correlation between paths.

$$C_{i,h} \quad \text{[Expression 20]}$$

is typically assumed to be expressed by the following Expression (18).

[Expression 21]

$$C_{i,h} = \begin{pmatrix} \sigma_0^2 & 0 & \cdots & 0 \\ 0 & \sigma_1^2 & \cdots & 0 \\ \vdots & \vdots & \ddots & \vdots \\ 0 & 0 & \cdots & \sigma_L^2 \end{pmatrix} \quad (18)$$

Figure 7:
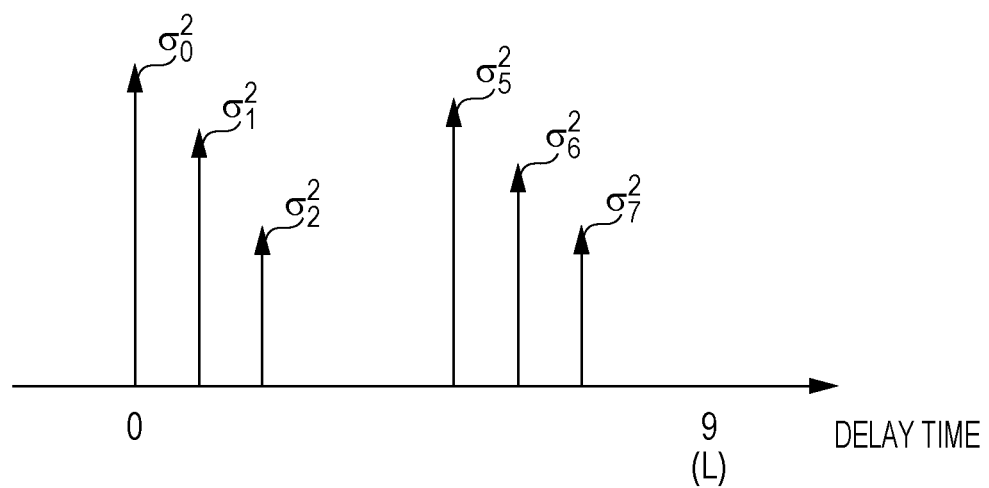
FIG. 7 illustrates an example of a delay profile.

$C_{i,h}$ is a diagonal matrix of a size L+1 having mean power of paths from 0 to L as main diagonal elements, and represents a delay profile. FIG. 7 illustrates an example of the delay profile, and no paths are present at locations of path numbers 3, 4, 8, and 9.

Since in practice, such $$C_h \quad \text{[Expression 22]}$$

is unknown, a different method is used for estimation. More specifically, the interim channel impulse response estimating unit b106-1 performs an IFFT operation on $H_{i,p}$ represented by the Expression (14) in accordance with the following Expression (19).

Figure 8:
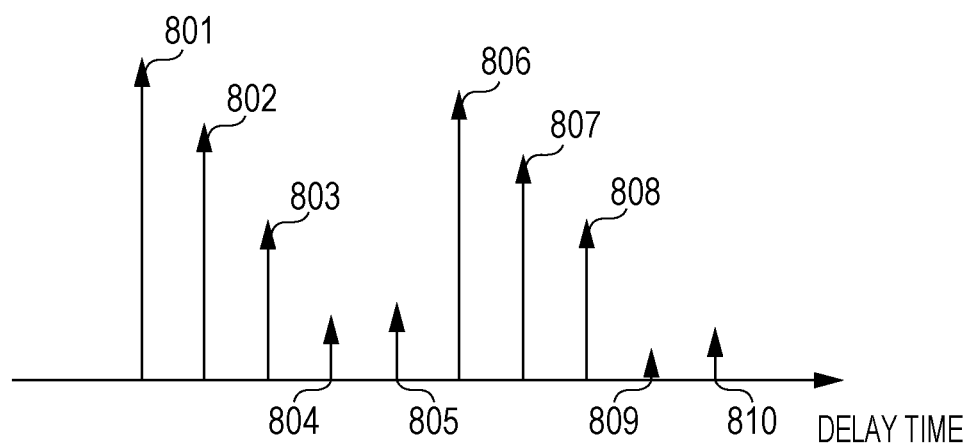
FIG. 8 illustrates a path forming an interim channel impulse response estimation value.

[Expression 23]

$$h_{i,a} = FH_{i,p} \quad (19)$$

$$h_{i,a} \quad \text{[Expression 24]}$$

is an interim channel impulse response estimation value and is illustrated in FIG. 8. FIG. 8 illustrates paths 801 through 810. In comparison with FIG. 7, because of the effect of noise and interference, and the number and locations of pilot signals, and other factors, paths 804, 805, 809, and 810, which are not observed in FIG. 7, are observed in FIG. 8 as if these paths are present. The path extracting unit b106-3 selects $N_s$ paths from among these paths in the order of from high to low power. $N_s$ may be determined at the design stage of the receiver apparatus b1, or may be set to be variable at the design stage, and then updated when the firmware, the software, or the like of the receiver apparatus b1 is updated.

An operation of the channel impulse response estimating unit b106-4 is described below. The operation is described with $N_s=7$ in FIG. 8. The paths to be selected are paths 801 through 803, and 805 through 808. In accordance with Expression (15), an estimation vector of the channel impulse response $$h_i \quad \text{[Expression 25]}$$

is expressed by the following Expression (20).

[Expression 26]

$$h_i = C''_{i,h} F^H (FC'_{i,h} F^H + \rho_z^2 I_{N_p})^{-1} H_{i,P} \quad (20)$$

Note that $$C'_{i,h} \quad \text{[Expression 27]}$$

is a matrix with $\sigma_0^2 = \sigma_1^2 = \sigma_2^2 = \sigma_4^2 = \sigma_5^2 = \sigma_6^2 = \sigma_7^2 = \alpha$ and $\sigma_3^2 = \sigma_8^2 = \sigma_9^2 = 0$ in Expression (18). Calculation operation is not necessarily performed precisely as expressed in Expression (20). Amount of calculation may be reduced by using matrix inversion lemma.

The frequency response estimating unit b106-5 time-frequency transforms the channel impulse response estimation value obtained in accordance with Expression (20), thereby transforming the channel impulse response estimation value into a frequency response estimation value to be demodulated.

Operation of Receiver Apparatus b1

Figure 9:
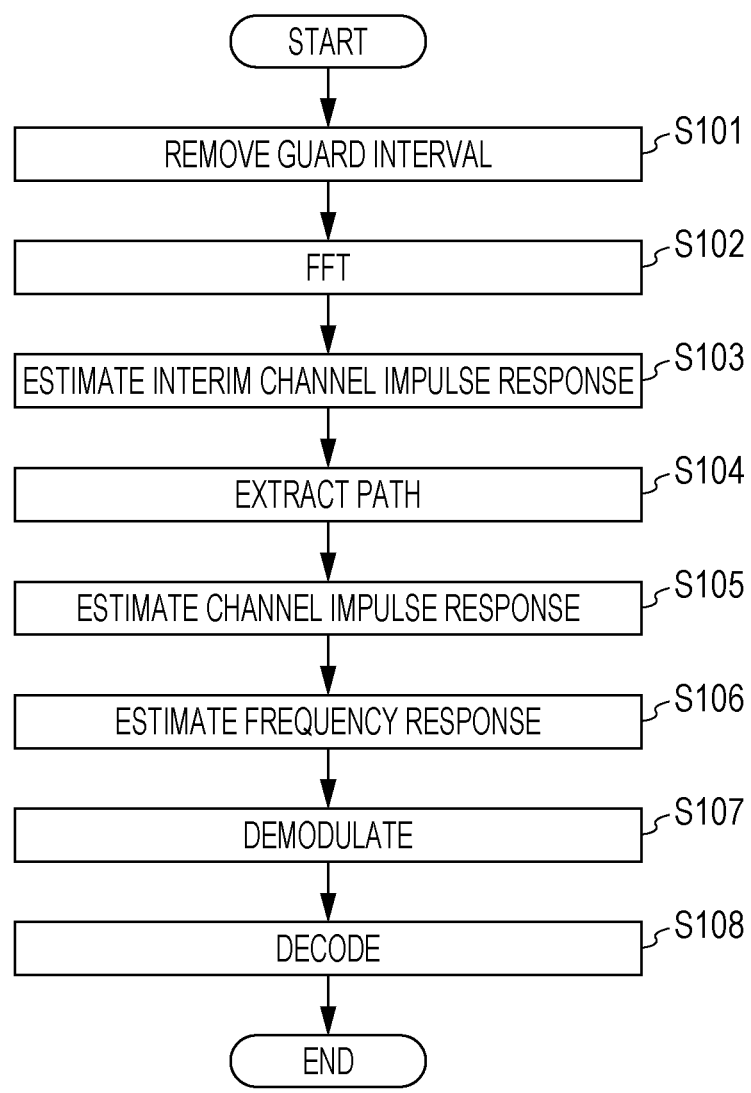
FIG. 9 is a flowchart illustrating an operation of the receiver apparatus of the first embodiment of the present invention.

FIG. 9 is a flowchart illustrating an operation of the receiver apparatus of the first embodiment of the present invention. The operation illustrated in FIG. 9 is an operation that is performed after the receiver unit b102 of FIG. 4 outputs the reception signal to the GI removal unit b103.

Step S101 The GI removal unit b103 removes the GI from the reception signal. Then, processing proceeds to step S102.

Step S102 The FFT unit b104 time-frequency transforms the signal obtained in step S101. The demapping unit b105 separates data and a pilot from the obtained signal in the frequency domain. The FFT unit b104 outputs the reception signal of the pilot subcarrier to the channel estimator b106, and then processing proceeds to step S103.

Step S103 The interim channel impulse response estimating unit b106-1 in the channel estimator b106 calculates the interim channel impulse response estimation value using the reception signal of the pilot subcarrier obtained in step S102. The interim channel impulse response estimating unit b106-1 outputs the calculated interim channel impulse response estimation value to the path extracting unit b106-3. Processing proceeds to step S104.

Step S104 The path extracting unit b106-3 extracts a path using the interim channel impulse response estimation value obtained in step S103, and then outputs the results to the channel impulse response estimating unit b106-4. Then, processing proceeds to step S105.

Step S105 The channel impulse response estimating unit b106-4 calculates a channel impulse response estimation value using path information obtained in step S104. Then, processing proceeds to step S106.

Step S106 The frequency response estimating unit b106-5 time-frequency transforms the channel impulse response estimation value obtained in step S105, thereby transforming the channel impulse response estimation value into a frequency response estimation value. Then, processing proceeds to step S107.

Step S107 The demodulator unit b107 performs a demodulation operation on the frequency response estimation value obtained in step S106. Then, processing proceeds to step S108.

Step S108 The decoding unit b108 decodes the demodulation results obtained in step S107. The operation of the receiver apparatus b1 is thus complete.

According to the present embodiment, the channel estimator b106 performs the IFFT operation on the frequency response estimation value of the pilot subcarrier to calculate the interim channel impulse response estimation value, extracts a path having higher power, and calculates the channel impulse response estimation value using the path information. In this way, an amount of operation that is left available as a result of not using the paths that do not need to be estimated may be used for suppressing noise and interference. The accuracy of the channel estimation is thus increased.

According to the first embodiment, the frequency response is estimated using the pilot symbol on a per OFDM symbol basis. Interpolation may be performed using the pilot symbol of an adjacent OFDM symbol. For example, as illustrated in FIG. 4, in the first OFDM symbols, in terms of location, the pilot subcarriers includes the lowest subcarrier, another subcarrier away by two notches, yet another subcarrier away by further two notches, . . . . Even at a location where no pilot subcarrier is present, the estimation process may be performed using a pilot symbol of an OFDM symbol at different time. The estimation process is performed for the subcarrier having the pilot symbol using a pilot symbol at different time, and noise and interferences are thus reduced. The propagation channel estimation accuracy is even more increased in this way. More specifically, the arithmetic averages may be used if variations in the propagation path are not large, or weighted averaging may be performed in response to the propagation path variations.

As described above, the pilot symbol is used as a reference signal for use in the estimation of the frequency response in the first embodiment. The frequency response may be estimated using data that has been determined. More specifically, the output of the demodulator unit b107 or the decoding unit b108 may be fed back to the interim channel impulse response estimating unit b106-1 to estimate the frequency response.

As described above, the communication system performs communications using a multi-carrier signal in the first embodiment. The present invention is not limited to this communication. The present invention is applicable to communications of a single-carrier signal performed using FFT.

According to the first embodiment, the demodulation operation is performed after transforming the calculated channel impulse response estimation value into the frequency response estimation value. Alternatively, the demodulation operation may be performed in the time domain using the channel impulse response estimation value. For example, if the communication of the single-carrier signal is performed, the demodulation in the time domain may be performed.

Second Embodiment

A second embodiment of the present invention is described in detail with reference to the drawings. In the first embodiment, the transmitter apparatus a1 transmits a multi-carrier signal and the like, which map the pilot signal to the frequency domain, the receiver apparatus b1 calculates the frequency response estimation value in the pilot subcarrier, calculates the interim channel impulse response estimation value by performing the IFFT operation on the frequency response estimation value, selects a path having a higher power, and then calculates the channel impulse response estimation value using the path. The present embodiment provides a method of performing the channel impulse response estimation on a plurality of extracted paths and selecting an optimum path.

A transmitter apparatus a2 of the second embodiment is identical to the transmitter apparatus a1 of the first embodiment, and the discussion thereof is omitted herein.

Figure 10:
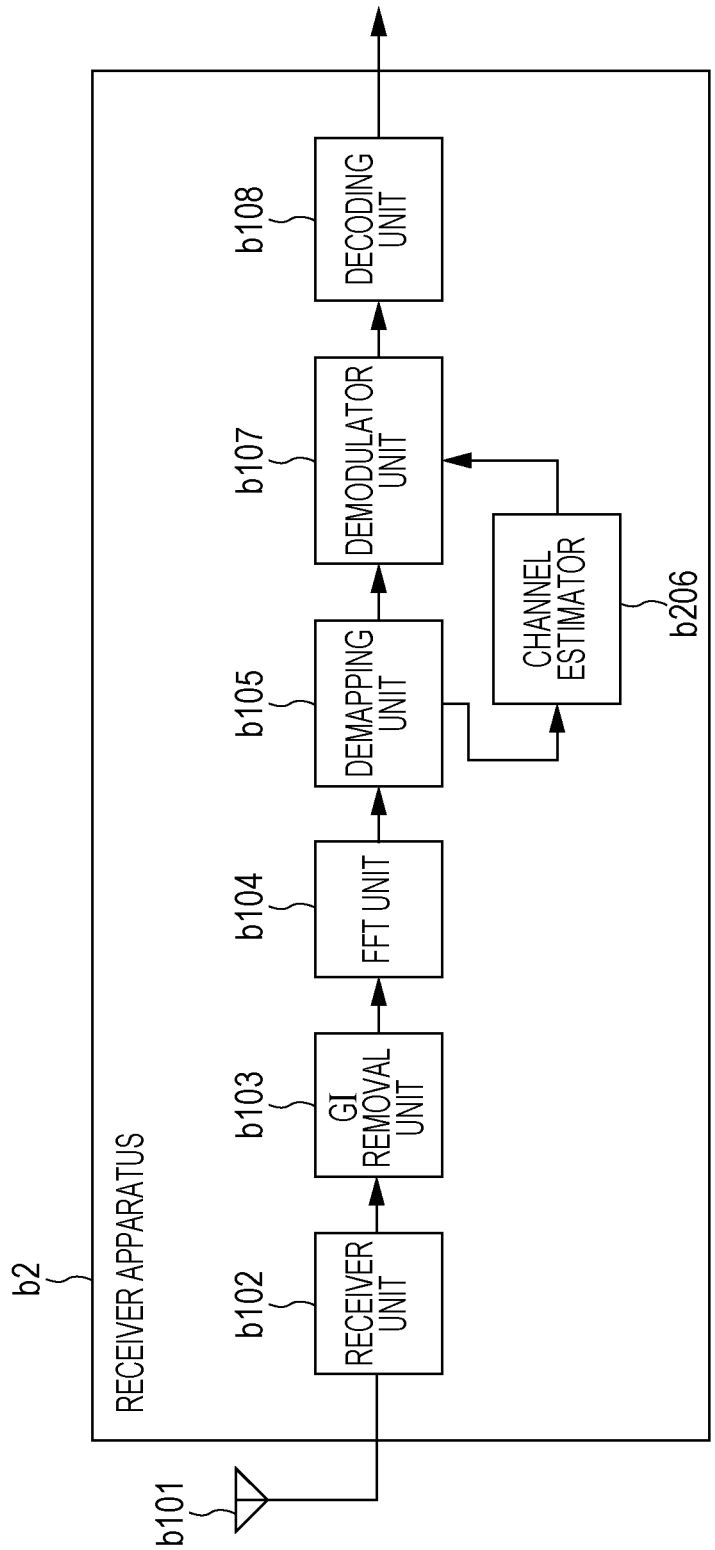
FIG. 10 is a schematic block diagram illustrating a configuration of a receiver apparatus b2 of a second embodiment of the present invention.

FIG. 10 is a schematic block diagram of the receiver apparatus b2 of the second embodiment of the present invention. In comparison of the receiver apparatus b2 of the present embodiment (FIG. 10) with the receiver apparatus b1 of the first embodiment (FIG. 4), the process of a channel estimator b206 is different. However, the functions of the other elements (the receive antenna b101, the receiver unit b102, the GI removal unit b103, the FFT unit b104, the demapping unit b105, the demodulator unit b107, and the decoding unit b108) are identical to those of the first embodiment. The discussion of the same functions as those of the first embodiment are omitted herein.

Figure 11:
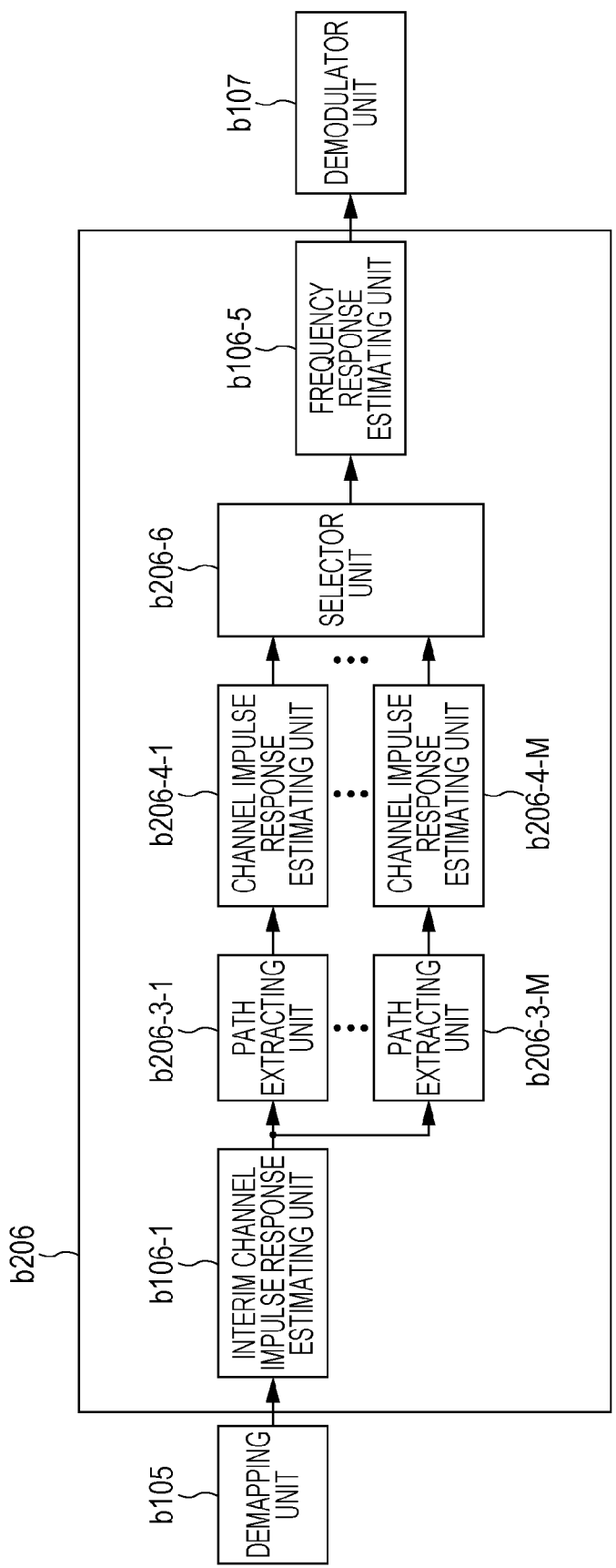
FIG. 11 is a schematic block diagram illustrating a configuration of a channel estimator b206.

FIG. 11 is a schematic block diagram illustrating a configuration of the channel estimator b206. As illustrated in FIG. 11, the channel estimator b206 includes an interim channel impulse response estimating unit b106-1, path extracting units b206-3-1 through b206-3-M, channel impulse response estimating units b206-4-1 through b206-4-M, a selector unit b206-6, and a frequency response estimating unit b106-5. The operation of the interim channel impulse response estimating unit b106-1 and the frequency response estimating unit b106-5 is identical to of the operation of the counterparts thereof in the channel estimator b106 (FIG. 5) of the first embodiment. The discussion of the same functions as those of the first embodiment is omitted herein.

The channel estimator b206 estimates M channel impulse responses. Let $N_s(m)$ represent the number of paths when an m-th channel impulse response is estimated. The number of estimations M and the number of extracted paths $N_s(m)$ may be fixed at the design stage of the receiver apparatus b2, or may be set to be variable at the design stage, and then updated when the firmware, the software, or the like of the receiver apparatus b2 is updated.

The path extracting units b206-3-M extracts $N_s(m)$ paths in the order of from high to low power from among the interim channel impulse response estimation values output from the interim channel impulse response estimating unit b106-1.

The flow of the process of the interim channel impulse response estimating unit b206-1-M to the channel impulse response estimating unit b206-4-M is identical to the flow of the process of the interim channel impulse response estimating unit b106-1 to the channel impulse response estimating unit b106-4 (FIG. 5). However, the number of extracted paths herein is $N_s(m)$.

The selector unit b206-6 compares M channel impulse response estimation values estimated by the channel impulse response estimating unit b206-4-1 through the channel impulse response estimating unit b206-4-M to select the best channel impulse response estimation value, and then outputs the best channel impulse response estimation value to the frequency response estimating unit b106-5. This process is described below together with the operating principle of the channel estimator b206.

The frequency response estimating unit b106-5 time-frequency transforms the channel impulse response estimation value output from the selector unit b206-6, thereby transforming the channel impulse response estimation value into a frequency response estimation value to be demodulated. The frequency response estimating unit b106-5 thus outputs the frequency response estimation value to the demodulator unit b107.

Operating Principle

The operating principle of the channel estimator b206 of the receiver apparatus b2 is described with reference to FIG. 11.

The channel impulse response estimation value output from the channel impulse response estimating unit b206-4-M is $$h_i(m).\quad\text{[Expression 28]}$$

The selector unit b206-6 selects m representing the best estimation value using $$h_i(m),\quad\text{[Expression 29]}$$

an interim channel impulse response estimation vector $$h_{i,a}\quad\text{[Expression 30]}$$

and the number of extracted paths $N_s$ (m). In this comparison operation, BIC (Bayesian Information Criterion) is used as described below.

A value f(m) of BIC with respect to an m-th estimation value is expressed by the following Expression (21).

[Expression 31]

$$f(m)=\sigma_z^{-2}h_{i,a}{}^H h_i(m)-\ln(N_P)N_s(m) \quad (21)$$

The first term of Expression (21) is an evaluation value of an error between the interim channel impulse response and the channel impulse response, and the second term is a penalty caused by an increase in the number of estimated paths. Expression (21) is an example of the evaluation value of the error and a quantity representing the goodness expressed by the penalty. Another criterion, such as AIC including an evaluation value and penalty, may also be used.

The selector unit b206-6 outputs the channel impulse response estimation value, corresponding to m that maximizes f(m), $$h_i(m)\quad\text{[Expression 32]}$$

to the frequency response estimating unit b106-5.

Operation of Receiver Apparatus b2

Figure 12:
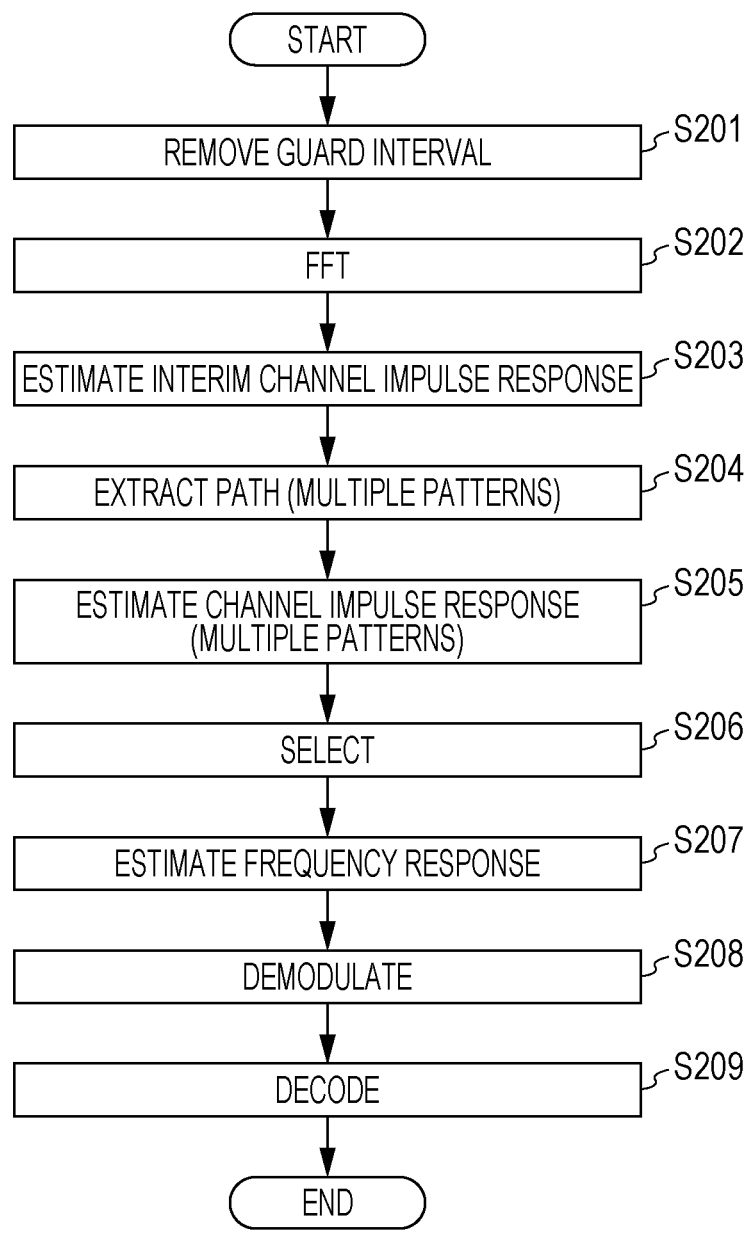
FIG. 12 is a flowchart illustrating an operation of the receiver apparatus of the second embodiment of the present invention.

FIG. 12 is a flowchart illustrating an operation of the receiver apparatus of the embodiment of the present invention. The operation illustrated in FIG. 12 is an operation that is performed after the receiver unit b102 of FIG. 10 outputs the reception signal to the GI removal unit b103.

Step S201 The GI removal unit b103 removes the GI from the reception signal. Then, processing proceeds to step S202.

Step S202 The FFT unit b104 time-frequency transforms the signal obtained in step S201. The demapping unit b105 separates data and a pilot from the obtained signal in the frequency domain. The reception signal of the pilot subcarrier is output to the channel estimator b206, and then processing proceeds to step S203.

Step S203 The interim channel impulse response estimating unit b106-1 in the channel estimator b206 calculates an interim channel impulse response estimation value using the reception signal of the pilot subcarrier obtained in step S202. The interim channel impulse response estimating unit b106-1 outputs the calculated interim channel impulse response estimation value to the path extracting units b206-3-1 through b206-3-M. Processing proceeds to step S204.

Step S204 The path extracting unit b206-3-M extracts a path using the interim channel impulse response estimation value obtained in step S203, and then outputs the extraction results to the channel impulse response estimating unit b206-4-M. Then, processing proceeds to step S205.

Step S205 The channel impulse response estimating unit b206-4-M calculates a channel impulse response estimation value using path information obtained in step S204. Then, processing proceeds to step S206.

Step S206 The selector unit b206-6 compares M channel impulse response estimation values obtained in step S205, thereby selecting the best value, and then outputs the best value to the frequency response estimating unit b106-5. Then, processing proceeds to step S207.

Step S207 The frequency response estimating unit b106-5 time-frequency transforms the channel impulse response estimation value obtained in step S206, thereby transforming the channel impulse response estimation value into a frequency response estimation value. Then, processing proceeds to step S208.

Step S208 The demodulator unit b107 performs a demodulation operation on the frequency response estimation value obtained in step S206. Then, processing proceeds to step S209.

Step S209 The decoding unit b108 decodes the demodulation results obtained in step S208. The operation of the receiver apparatus b2 is thus complete.

According to the present embodiment, the channel estimator b206 performs the IFFT operation on the frequency response estimation value of the pilot subcarrier to calculate the interim channel impulse response estimation value, extracts a path having higher power, and calculates the channel impulse response estimation value using the path information. The channel estimator b206 compares the channel impulse response estimation values obtained from the plurality of extracted paths, and selects the best value. In this way, an amount of operation that is left available as a result of not using the paths that do not need to be estimated may be used for suppressing noise and interference. The accuracy of the channel estimation is thus increased. The present embodiment accounts for the plurality of paths, and thus responds to a change in the operational environment of the communication system.

In the above discussion, M types of path extracting operations are performed in parallel as illustrated in FIG. 11. The path extracting operations may be performed sequentially in series.

Third Embodiment

A third embodiment of the present invention is described in detail with reference to the drawings. In the channel estimator of the second embodiment, the transmitter apparatus a1 transmits the multi-carrier signal and the like, which map the pilot signal to the frequency domain, the receiver apparatuses b1 and b2 calculate the frequency response estimation value in the pilot subcarrier, calculate the interim channel impulse response estimation value by performing the IFFT operation on the frequency response estimation value, perform the extraction of a path having a higher power by multiple times, select the best path, and then calculate the channel impulse response using the selected extracted path. In the present embodiment, all paths from a preceding path to a path having an assumed maximum delay time are estimated, an operation to reduce the number of paths is performed, and if the reduction operation proves satisfactory, a remaining path as a result of the reduction operation is used as an extracted path.

A transmitter apparatus of the third embodiment of the present invention is identical to the transmitter apparatus a1 of the first embodiment, and the discussion thereof is omitted herein.

Figure 13:
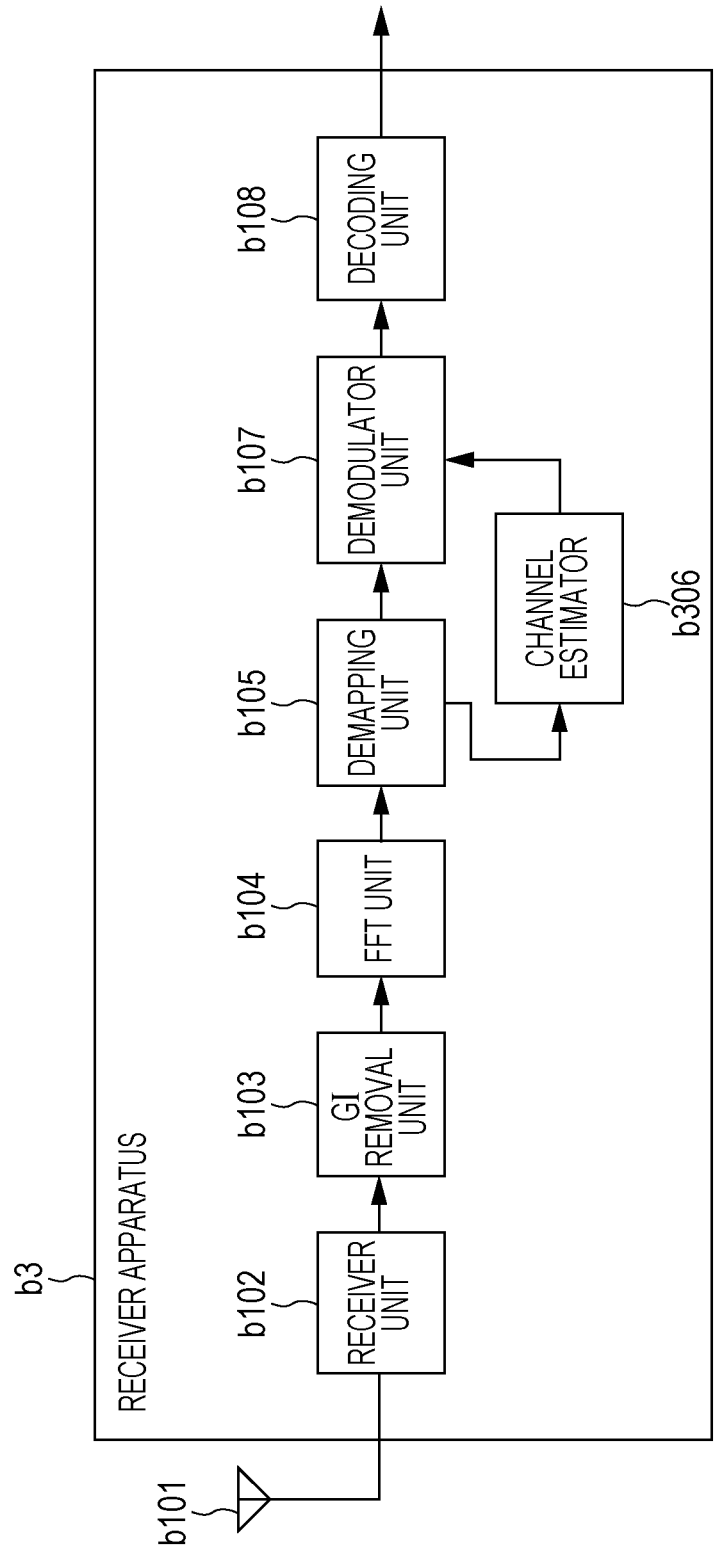
FIG. 13 is a schematic block diagram illustrating a configuration of a receiver apparatus b3 of a third embodiment of the present invention.

FIG. 13 is a schematic block diagram illustrating a configuration of a receiver apparatus b3 of the third embodiment of the present invention. In comparison of the receiver apparatus b3 of the present embodiment (FIG. 13) with the receiver apparatus b1 of the first embodiment (FIG. 4), the process of the channel estimator b206 is different. However, the functions of the other elements (the receive antenna b101, the receiver unit b102, the GI removal unit b103, the FFT unit b104, the demapping unit b105, the demodulator unit b107, and the decoding unit b108) are identical to those of the first embodiment. The discussion of the same functions as those of the first embodiment are omitted herein.

Figure 14:
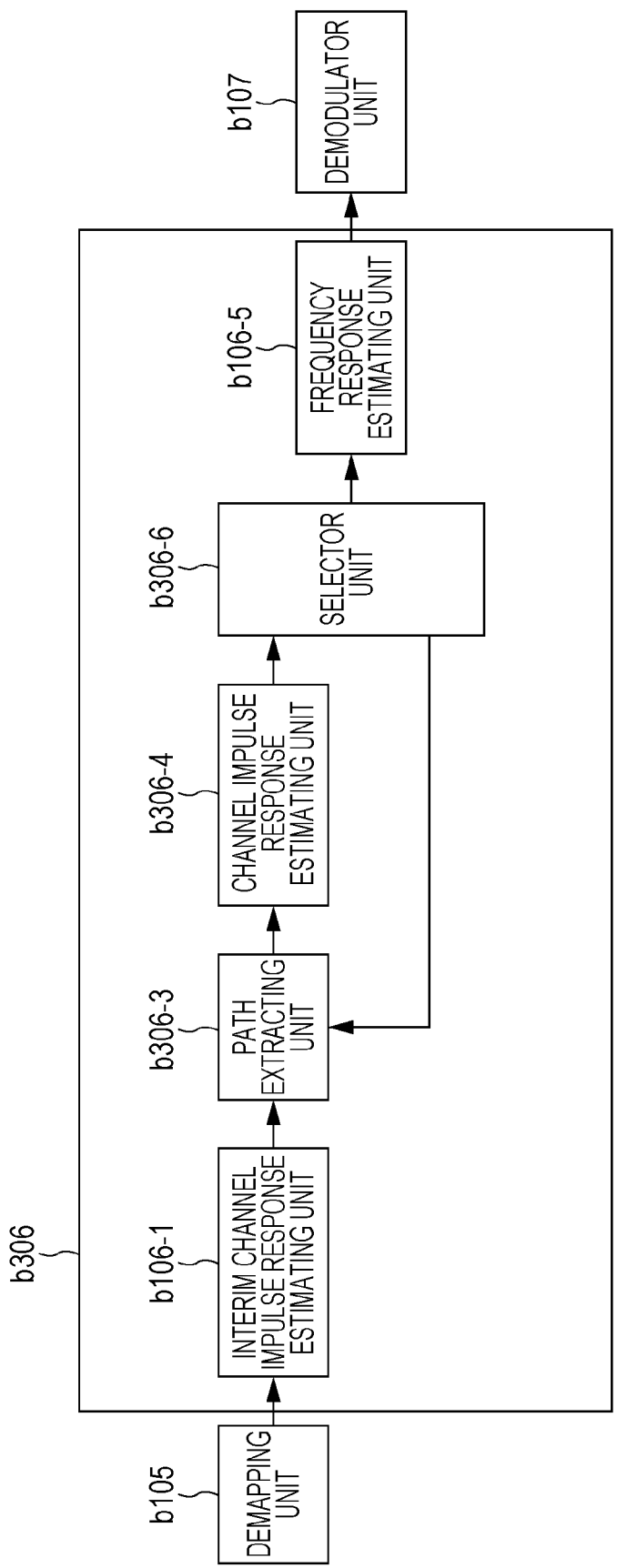
FIG. 14 is a schematic block diagram illustrating a configuration of a channel estimator b306.

FIG. 14 is a schematic block diagram illustrating a configuration of a channel estimator b306. In comparison of the channel estimator b306 in the receiver apparatus b3 (FIG. 14) with the channel estimator b106 in the receiver apparatus b1 (FIG. 5), the operation of a path extracting unit b306-3 and a channel impulse response estimating unit b306-4 is different from the operation of the counterparts thereof in the first embodiment, and a selector unit b306-6 is added. The operations of the interim channel impulse response estimating unit b106-1 and the frequency response estimating unit b106-5 are identical to the operations of the counterparts thereof in the channel estimator b106 of the first embodiment (FIG. 5). The discussion of the same functions as those of the first embodiment is omitted herein.

The operations of the path extracting unit b306-3, the channel impulse response estimating unit b306-4, and the selector unit b306-6 in the channel estimator b306 are iterated until the best results are obtained.

The path extracting unit b306-3 determines that the number of extracted paths at a first cycle is the number of all paths from the preceding path to the path having the maximum delay time L. In the same manner as in the first embodiment, this value may be fixed when the receiver apparatus b3 is developed. Alternatively, this value may be set to be variable at the design stage of the receiver apparatus b3 and then updated when firmware, software, or the like of the receiver apparatus b3 are updated. In the iteration process, the number of extracted paths is a number resulting from subtracting $N_i$ from the number of extracted paths at a preceding cycle.

The channel impulse response estimating unit b306-4 calculates the channel impulse response estimation value in accordance with information of a path location output from the path extracting unit b306-3.

The selector unit b306-6 does not do anything at the first cycle, but outputs an instruction to reduce the number of extracted paths to the path extracting unit. The selector unit b306-6 stores the channel impulse response estimation value output from the channel impulse response estimating unit b306-4. In the iteration process, the selector unit b306-6 compares the channel impulse response estimation value output from the channel impulse response estimating unit b306-4 with the channel impulse response estimation value stored on the selector unit b306-6 in accordance with Expression (21). If the value stored on the selector unit b306-6 is better, the selector unit b306-6 ends the estimation process, and outputs the channel impulse response estimation value stored thereon to the frequency response estimating unit b106-5. If the value stored on the selector unit b306-6 is worse, the selector unit b306-6 outputs an instruction to reduce the number of extracted paths to the path extracting unit. The selector unit b306-6 stores the channel impulse response estimation value output from the channel impulse response estimating unit b306-4, and continues the iteration process.

Operating Principle

The operating principle of the channel estimator b306 in the receiver apparatus b3 is described with reference to FIG. 14. The channel impulse response estimation value, output from the interim channel impulse response estimating unit b106-1, $$h_{i,a} \quad \text{[Expression 33]}$$

is described referring to FIG. 8 as an example.

Since the path extracting unit b306-3 extracts all paths from the preceding path to the path having the assumed maximum delay time at the first cycle, the paths 801 through 810 in FIG. 8 are extracted. A vector storing a path number extracted at a k-th trial is expressed by $$p(k). \quad \text{[Expression 34]}$$

From the above discussion, let k=0 represent a first cycle, $$p(0)=(0,1,\ldots,9)^T \quad \text{[Expression 35]}$$

holds true.

Next, the channel impulse response estimating unit b306-4 calculates the channel impulse response estimation value in accordance with the path information. An estimation value $$h_i(k) \quad \text{[Expression 36]}$$

is assumed at the k-th trial.

The selector unit b306-6 compares $$h_i(k-1) \quad \text{[Expression 37]}$$

and $$h_i(k). \quad \text{[Expression 38]}$$

Expression (21) may be used as a comparison criterion. If $$h_i(k-1) \quad \text{[Expression 39]}$$

is better, $$h_i(k-1) \quad \text{[Expression 40]}$$

is output to the frequency response estimating unit b106-5 and the estimation process ends. If $$h_i(k) \quad \text{[Expression 41]}$$

is better, $$h_i(k-1) \text{ stored on the selector unit b306-6} \quad \text{[Expression 42]}$$

is discarded, and $$h_i(k) \quad \text{[Expression 43]}$$

is stored. Next, the selector unit b306-6 outputs the instruction to reduce the number of extracted paths to the path extracting unit b306-3, and then proceeds to a (k+1)-th trial.

Upon receiving the instruction to reduce the number of extracted paths from the selector unit b306-6, the path extracting unit b306-3 deletes, from paths expressed by $$p(k-1), \quad \text{[Expression 44]}$$

paths having the values of $$h_{i,a} \quad \text{[Expression 45]}$$

whichever is smaller. Let the location of a remaining path be a new extracted path $$p(k). \quad \text{[Expression 46]}$$

The trial of k=1 may be now considered in FIG. 8. In such a case, $$p(0) \quad \text{[Expression 47]}$$

is from 801 to 810. If the number of paths to be deleted is 2, the paths to be deleted are 809 and 810.

$$p(1)=(0,1,\ldots,7)^T \quad \text{[Expression 48]}$$

holds true. The process beginning with the operation of the channel impulse response estimating unit b306-4 is iterated.

Operation of Receiver Apparatus b3

FIG. 15 is a flowchart illustrating an operation of the receiver apparatus of the present embodiment. The operation illustrated in FIG. 15 is performed after the receiver unit b102 of FIG. 13 outputs the reception signal to the GI removal unit b103.

Step S301 The GI removal unit b103 removes the GI from the reception signal. Then, processing proceeds to step S302.

Step S302 The FFT unit b104 time-frequency transforms the signal obtained in step S301. The demapping unit b105 separates data and a pilot from the obtained signal in the frequency domain. The reception signal of the pilot subcarrier is output to the channel estimator b106, and then processing proceeds to step S303.

Step S303 The interim channel impulse response estimating unit b106-1 in the channel estimator b206 calculates an interim channel impulse response estimation value using the reception signal of the pilot subcarrier obtained in step S302. The interim channel impulse response estimating unit b106-1 outputs the calculated interim channel impulse response estimation value to the path extracting units b306-3. Processing proceeds to step S304.

Step S304 The path extracting unit b306-3 extracts a path using the interim channel impulse response estimation value obtained in step S303, and then outputs the extraction results to the channel impulse response estimating unit b306-4. Then, processing proceeds to step S305.

Step S305 The channel impulse response estimating unit b306-4 calculates a channel impulse response estimation value using path information obtained in step S304. Then, processing proceeds to step S306.

Step S306 The selector unit b306-6 compares the channel impulse response estimation value obtained in step S305 with the channel impulse response estimation value stored on the selector unit b306-6. Then, processing proceeds to step S307.

Step S307 If the results in step S306 indicate that the channel impulse response estimation value obtained in step S305 is better than the channel impulse response estimation value stored on the selector unit b306-6, the selector unit b306-6 discards the channel impulse response estimation value stored thereon, and stores the channel impulse response estimation value, obtained in step S305, thereon. The selector unit b306-6 causes the path extracting unit b306-3 to reduce the number of extracted paths. Then, processing proceeds to step S305.

If the condition in step S307 is not satisfied, the selector unit b306-6 outputs the channel impulse response estimation value stored thereon to the frequency response estimating unit b106-5. Processing proceeds to step S308.

Step S308 The frequency response estimating unit b106-5 time-frequency transforms the channel impulse response estimation value obtained in step S307, thereby transforming the channel impulse response estimation value into a frequency response estimation value. Then, processing proceeds to step S309.

Step S309 The demodulator unit b107 performs a demodulation operation on the frequency response estimation value obtained in step S308. Then, processing proceeds to step S310.

Step S310 The decoding unit b108 decodes the demodulation results obtained in step S309. The operation of the receiver apparatus b3 is thus complete.

According to the present embodiment, the channel estimator b306 performs the IFFT operation on the frequency response estimation value of the pilot subcarrier to calculate the interim channel impulse response estimation value, calculates the channel impulse response estimation values using all the paths from the preceding path to the path having the assumed maximum delay, iterates the calculation of the channel impulse response estimation value with the number of paths decreased, and ends the process thereof with the best number of paths. The channel estimator b306 thus obtains the best channel impulse response estimation value. With this arrangement, an amount of operation that is left available as a result of not using the paths that do not need to be estimated may be used for suppressing noise and interference. The accuracy of the channel estimation is thus increased. Since the present embodiment adaptively determines the optimum number of paths appropriate for an environment, the present embodiment has a high ability to respond to a change in the environment.

In the third embodiment described above, the calculation of the channel impulse response estimation value is iterated while the number of extracted paths is decreased. Alternatively, the number of extracted paths may be increased from a smaller number. For example, the channel impulse response estimation value is calculated with a smaller number of extracted paths at a first estimation, and in the iteration process, the number of extracted paths is increased.

In the third embodiment described above, the calculation of the channel impulse response estimation value is iterated while the number of extracted paths is decreased. Alternatively, the iteration process is terminated in the middle thereof. For example, a maximum number of iterations is predetermined, and when the channel estimator reaches the maximum number of iteration, processing proceeds to step S308 regardless of the results in step S307.

Part of the transmitter apparatus a1 and the receiver apparatuses b1 through b3 in the above embodiments, for example, the channel estimator b106 and the demodulator unit b107, may be implemented using a computer. In such a case, a program to implement the control function may be executed by recording the program on a computer readable recording medium, and reading the program recorded on the recording medium onto the computer system.

The term "computer system" refers to a computer system built into one of the transmitter apparatus a1, and the receiver apparatuses b1 through b3, and includes an OS and hardware such as a peripheral device. The term "computer readable recording medium" refers to a portable medium, such as a flexible disk, a magneto-optical disk, ROM, or CD-ROM, or a recording device, such as a hard disk, built into the computer system. The "computer readable recording medium" may include a communication line that holds dynamically the program for a short period of time. The communication line transmits the program via a communication channel such as a network like the Internet or a telephone line. The "computer readable recording medium" may also include a volatile memory in the computer system that may be a server or a client and stores the program for a predetermined period of time. The program may implement part of the above-described function. The part of the above-described function may be used in combination with a program previously recorded on the computer system.

Part or whole of the transmitter apparatus a1, and the receiver apparatuses b1 through b3 in the above embodiments, may be implemented as an integrated circuit such as LSI (Large Scale Integration). The function blocks of the transmitter apparatus a1, and the receiver apparatuses b1 through b3 may be individually implemented using processors, and part or whole of the function blocks may be integrated into a processor. The technique of integration is not limited to LSI. A dedicated circuit or a general-purpose processor may be employed. If a technique of circuit integration replacing the present LSI appears with the advance of semiconductor technique, an integrated circuit resulting from the technique may also be used.

The embodiments of the present invention have been described in detail with reference to the drawings. The specific configuration of the embodiments is not limited to the configuration described above. A variety of design changes is incorporated without departing from the scope of the present invention.

REFERENCE SIGNS LIST a1 Transmitter apparatus
a101 Pilot generating unit
a102 Encoding unit
a103 Modulator unit
a104 Mapping unit
a105 IFFT unit
a106 GI insertion unit
a107 Transceiver unit
a108 Transmit antenna
b1, b2, and b3 Receiver apparatuses
b101 Receive antenna
b102 Receiver unit
b103 GI removal unit
b104 FFT unit
b105 Demapping unit
b106, b206, and b306 Channel estimators
b107 Demodulator unit
b108 Decoding unit
b106-1 Interim channel impulse response estimating unit
b106-3, b206-3-1 through b206-3-M, and b306-3 Path extracting units
b106-4, b206-4-1 through b206-4-M, and b306-4 Channel impulse response estimating units
b106-5 Frequency response estimating unit
b206-6 and b306-6 Selector units All the publication, patents and patent applications cited in this description are incorporated by reference in their entirety herein.

The invention claimed is:

1. A receiver apparatus that includes a channel estimator to perform channel estimation,
the channel estimator comprising:
an interim channel impulse estimating unit that calculates an interim channel impulse response estimation value,
a path extracting unit that extracts a path location for use in calculation of a channel impulse response estimation value from among paths forming the interim channel impulse response estimation values,
a channel impulse response estimating unit that calculates the channel impulse response estimation value using the path location extracted by the path extracting unit, and
a frequency response estimating unit that converts the channel impulse response estimation value into a frequency response estimation value by time-frequency transforming the channel impulse response estimation value.

2. The receiver apparatus according to claim 1, therein the channel estimator further comprises a selector unit that selects one channel impulse response estimation value from among at least two channel impulse response estimation values.

3. The receiver apparatus according to claim 2, wherein the channel estimator comprises a plurality of path extracting units and a plurality of channel impulse response estimating units.

4. The receiver apparatus according to claim 3, wherein the channel estimator successively iterates a calculation of the channel impulse response estimation value.

5. The receiver apparatus according to claim 4, wherein the path extracting unit successively iterates the calculation of the channel impulse response estimation value with the number of paths decreased.

6. The receiver apparatus according to claim 4, wherein the path extracting unit successively iterates the calculation of the channel impulse response estimation value with the number of paths increased.

7. The receiver apparatus according to claim 6, wherein upon completing a predetermined number of iterations of the calculation of the channel impulse response estimation value, the channel estimator ends an estimation operation thereof.

8. The receiver apparatus according to claim 2, wherein the selector unit selects the channel impulse response estimation value in accordance with a Bayesian information criterion.

9. The receiver apparatus according to claim 1, wherein the path extracting unit extracts paths of the number that is predetermined in the order of from high to low power of the interim channel impulse response estimation values.

10. A reception method including a channel estimation process to calculate a channel impulse response estimation value by performing channel estimation,
the channel estimation process comprising:
an interim channel response estimating operation to calculate an interim channel impulse response estimation value,
a path extracting operation to extract a path location for use in calculation of a channel impulse response estimation value from among paths forming the interim channel impulse response estimation values,
a channel impulse response estimating operation to calculate the channel impulse response estimation value using the path location extracted in the path extracting operation, and
a frequency response estimating operation to convert the channel impulse response estimation value into a frequency response estimation value by time-to-frequency transforming the channel impulse response estimation value.

11. A non-transitory computer-readable medium storing a reception program for causing a computer to perform the reception method according to claim 10.

* * * * *